United States Patent
Willoughby et al

[11] 3,749,477
[45] July 31, 1973

[54] ANAMORPHIC LENS SYSTEM

[76] Inventors: John H. Willoughby, 1232 El Vago St., La Canada; Barry G. Broome, 415 E. Foothill, Monrovia, both of Calif.

[22] Filed: Aug. 16, 1971

[21] Appl. No.: 171,942

[52] U.S. Cl. .................................. 350/181, 350/190
[51] Int. Cl. ........................................... G02b 13/08
[58] Field of Search .................... 350/181, 190, 212

[56] References Cited
UNITED STATES PATENTS

| | | | |
|---|---|---|---|
| 2,944,464 | 7/1960 | Rosin | 350/181 |
| 3,472,578 | 10/1969 | Price | 350/212 |
| 2,997,921 | 8/1961 | Lynch et al. | 350/175 NG UX |
| 3,359,056 | 12/1967 | Offner | 350/181 |
| 2,832,262 | 4/1958 | Cook | 350/181 |

*Primary Examiner*—John K. Corbin
*Attorney*—Jackson & Jones

[57] ABSTRACT

An anamorphic lens system is disclosed for attachment to cameras having low effective aperture prime lenses. The lens system comprises a plurality of plastic lens elements having a low dispersion property. The lens elements are characterized in that the aberration introduced by one or more elements in the positive sense is matched by one or more elements in the negative sense. These capabilities enable the lens system to be manufactured more economically, while still having a high degree of aberration control.

22 Claims, 3 Drawing Figures

PATENTED JUL 31 1973 3,749,477
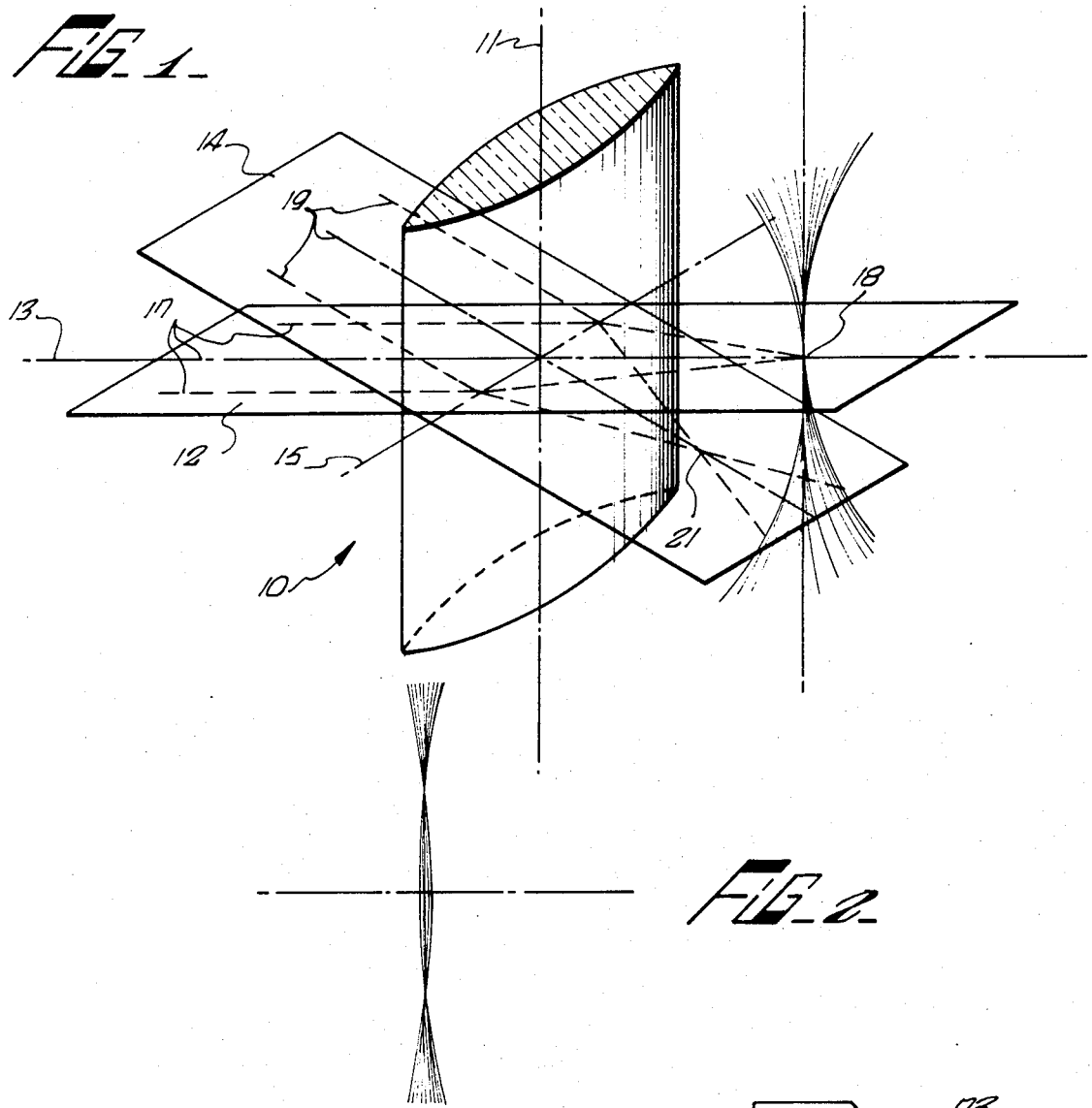
FIG. 1
FIG. 2
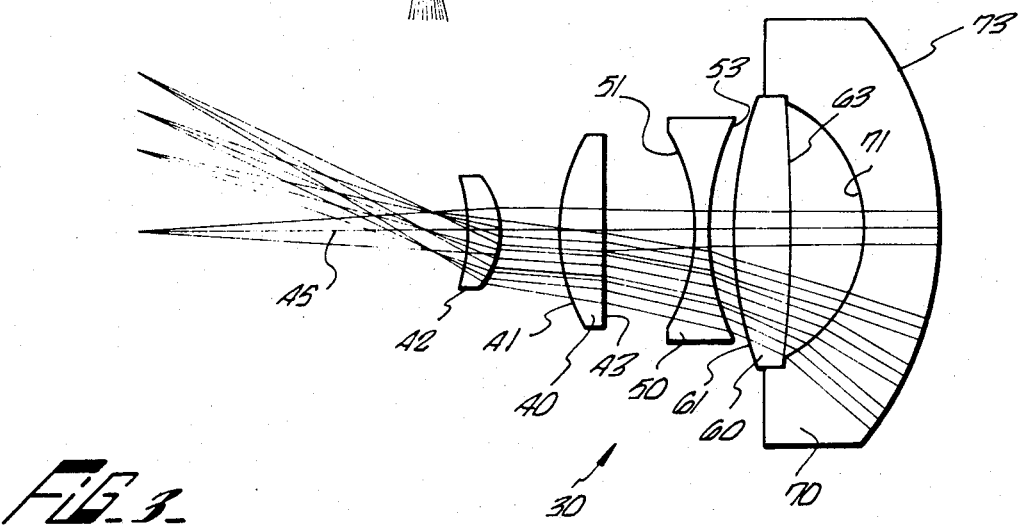
FIG. 3

ANAMORPHIC LENS SYSTEM

BACKGROUND OF THE INVENTION

1. Field of the Invention

The present invention relates to a lens attachment for fixed lens cameras and more particularly to anamorphic lens systems for increasing the angular field of view presented to the film plane in one direction only.

2. Description of the Prior Art

In recent years, the most popular cameras on the market have been the INSTAMATIC format cameras. Such cameras basically utilize low effective aperture prime lenses. Until the present invention, these cameras were only capable of producing square pictures of a scene. If it were desired to increase the field of view, the operator had to move further away from the scene. This, however, made the particular objects in the scene smaller.

Maintaining the previous object size while increasing the angular field of view of the scene is not currently possible in such fixed lens cameras. A solution to this problem would be to attach an anamorphic lens system to the front of the camera's prime lens so that it is placed between the object being photographed and the prime lens. This lens system would increase the angular field of view presented to the film plane of the camera in one direction only. However, anamorphic lens attachments for INSTAMATIC cameras have not been made available for various reasons. The prime reason is that the expense of prior anamorphic lens systems makes it economically unfeasible for them to be sold as attachments to the above, relatively inexpensive cameras.

Moreover, the printing of the film taken with an anamorphic lens system must be accomplished with a similar lens system. Most film processing laboratories are not equipped with such systems; mainly due to their expense. As a result, even if anamorphic lens systems were available for such cameras, users would be inconvenienced in attempting to find a film processor who could develop such film.

The main reason for the high cost of present day anamorphic lens systems is the cost associated with the manufacturing processes used with optical glasses. Existing anamorphic lens systems utilize glass, which is quite costly to manufacture. Heretofore, the use of plastics was not feasible because their dispersion qualities required that the individual lenses in the system be made from different materials.

Another problem with anamorphic lens systems is that such systems utilize cylindrical surfaces which have a unique optical aberration problem that seriously degrades the image quality of the objects. This property in cylindrical lens systems is clearly discussed in U. S. Pat. No. 3,359,056. As stated in that patent disclosure, a cylindrical lens has the property that the focal length of the lens for a fan of rays in a normal plane is different than for a fan of rays in the inclined plane. This condition produces an aberrational defect in the image which causes a line object to be imaged with a "bow tie" appearance. The disclosure in U. S. Pat. No. 3,359,056 describes a technique for reducing this aberration in two and three lens systems by judicious choice of the first order properties of the lens elements, this choice being a correlation of the focal lengths, spacing and refractive indices of the lens elements. A shortcoming with such a system is that the mathematics involved in the lens design is too restrictive. As a result, the practical applications for such a system are very limited.

SUMMARY OF THE INVENTION

The present invention obviates the above-mentioned shortcomings by providing an anamorphic lens system that is economically feasible to be sold as an attachment for relatively inexpensive cameras having low effective aperture prime lenses.

The anamorphic lens system comprises a plurality of lens elements all made of a plastic having a low dispersion property and are shaped and grouped to introduce a relatively small amount of bending to a fan of rays for any chosen object point. This enables the color aberrations to be reduced to a negligibly small value so that only one material is required for the elements to make such corrections.

The lens elements are also characterized in that the aberration introduced by one group of elements is matched or compensated for by another group of elements to achieve a higher degree of aberration correction.

Another advantage of the present invention is that the number of elements in the system can be extended without limit, and the field of view and relative aperture properties can be extended to the same limits associated with non-anamorphic systems.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a view of a single cylindrical lens having different focal lengths for rays in a normal and in an inclined plane to produce a cylindrical oblique aberration;

FIG. 2 is a graphic view of a cylindrical oblique aberration corrected in accordance with the present invention; and FIG. 3 is a sectional view of the preferred embodiment of the anamorphic lens system in accordance with the present invention.

DESCRIPTION OF THE PREFERRED EMBODIMENT

Referring now to the drawings, FIG. 1 illustrates a positive cylindrical lens 10 having a center line 11 parallel to the axes (not shown) of the two cylindrical surfaces of the lens. Plane 12 is a plane normal to the center line 11 and comprises a center line 13 lying therein perpendicular to the cylindrical surfaces of the lens at the point of intersection therewith. The plane containing center lines 11 and 13 may be termed the non-power plane of the lens 10.

An inclined plane 14 is illustrated lying at an angle with the normal plane 12. These planes intersect along line 15 which, in turn, is perpendicular to the center line 11.

A fan or rays 17 in the normal plane 12 and parallel to center line 13 will be brought to a focus at point 18. For convenience, the lens 10 will be considered to be a thin lens and focal lengths indicated with respect to the center line 11.

A family of rays 19 lying in the inclined plane 14 will be brought to a focus at point 21 which is closer to the lens 10. If an image plane were placed at point 18 parallel to the lens 10, the fan of rays 19 would intersect at point 21 and diverge at the image plane. As a result, this variation in focal length produces an oblique aberrational defect in the image which causes a line object to be imaged with a "bow tie" appearance.

The present invention corrects for this oblique clyindrical aberration by providing a lens system having a plurality of lens elements in which the aberration produced by the first group of lens elements is matched or compensated for by a second group of lens elements. In the preferred embodiment, the first group is represented by three lens elements 50, 60, and 70 which produce a net amount of negative cylindrical oblique aberration. The second group is represented by a single lens element 40 which produces a net amount of positive cylindrical oblique aberration which compensates precisely (for one field angle only) the aberration produced by the first three lens elements. This aberration correction is illustrated in FIG. 2.

FIG. 3 shows the preferred embodiment of the lens system, generally indicated by arrow 30, comprising a plurality of lens elements 40, 50, 60 and 70 respectively. Lens element 40 comprises a convex cylindrical surface 41 which is adapted to be positioned adjacent the prime lens 42 of a fixed lens camera. The radius of surface 41 is 0.6335 inches. The other side of the lens element 40 comprises a planar surface 43 with the thickness of the lens element 20 being 0.1850 inches at the optic axis 45 of the system 30.

Lens element 50 comprises a first concave cylindrical surface 51 facing the lens element 40 and is spaced therefrom 0.3250 inches along the center line 45. The first cylindrical surface 51 has a radius of 0.7400 inches. The lens element 50 further comprises second concave cylindrical surface 53 located on the other side of the lens element 50. The surface 53 is of a radius of 0.8225 inches while the thickness of the lens element 50 is 0.0600 inches at the optic axis 45.

The lens element 60 comprises a first convex cylindrical surface 61 facing the lens element 50. The surface 61 has a radius of 1.2330 inches and is spaced 0.0837 inches from the lens element 50 at the optic axis 45. The other side of the lens element 60 comprises a second convex cylindrical surface having a radius of 4.0000 inches. The thickness of the lens element 60 is 0.2250 inches at the optic axis 45.

The lens element 70 comprises a concave cylindrical surface 71 facing the lens element 60 and having a radius of 0.5000 inches. The lens element 70 is spaced 0.3034 from the lens element 60 at the optic axis 45. The other side of the lens element 70 comprises a convex cylindrical surface 73 having a radius of 1.2541 with the thickness of the lens element being 0.2500 inches along the optic axis 45.

Each of the elements 40, 50, 60, and 70 is made of a molded methyl methacrylate having an index of refraction of 1.4920. This choice is preferred because of the low dispersion property of the plastic. Moreover, the shape of the lens elements create a relatively small amount of bending to the fan of rays originating at any chosen object point. Four of such fans are traced in FIG. 3. This combination of factors reduces the chromatic aberrations to negligibly small values so that corrections can be made with lens elements of a single material. This, of course, is advantageous economically in the manufacture of the system.

In the preferred embodiment, the lens element 60 is also shaped to provide a strong control of power plane distortion while still providing a moderate amount of positive cylindrical oblique aberration which reduces the large negative aberration associated with the lens element 50 to a tolerable level.

In the power plane, aberration control can be based on the following facts unique to the present invention. (1) The positive coma introduced by the lens element 40 corrects the negative coma introduced by the lens elements 70 and 50. (2) The surfaces 61 and 41 of the lens elements 60 and 40 compensate for the astigmatism introduced by the lens elements 70 and 50. (3) The lens element 60 and to a lesser degree, lens element 40, provide distortion correction opposite in sign to that introduced by the lens elements 70 and 50. (4) The disposition of refractive power throughout the four lens elements corrects the Petzval sum to a near zero value.

As a result, a higher control of aberration correction is provided by the present invention through the selection of proper shape, index of refraction and dispersion properties of the lens elements.

It should be noted that various modifications can be made to the apparatus while still remaining within the purview of the following claims. Moreover, the anamorphic lens system can be permanently mounted on a camera to form an integral lens system with the prime lens thereof.

What is claimed is:

1. A plastic anamorphic cylindrical lens system for providing an increased angular field of view resulting from a different magnification of image rays in each of two perpendicular directions comprising:
   a first diverging group of plastic cylindrical lens elements aligned to have a power plane in one direction and a traverse non-power plane in another direction, at least one cylindrical lens element introducing negative cylindrical oblique ray aberrations in both the power plane and the non-power plane and a second plastic converging cylindrical lens element introducing positive cylindrical oblique ray aberrations to apply a concurrent correction in both the power plane and the non-power plane of the oblique ray aberrations, the plastic of each lens having a low dispersion factor and approximately the same index of refraction.

2. The invention of claim 1 wherein said plastic material is methyl methacrylate.

3. The invention of claim 2 wherein said elements are shaped and grouped to introduce a relatively small amount of bending to a fan of rays at any chosen object point.

4. The invention of claim 1 wherein said elements comprise four elements poisitioned along an optical axis, the first three elements forming a group which diverges the fan of rays entering the first element to introduce a net amount of negative cylindrical oblique aberration, the fourth element converging the fan of rays in a manner to introduce a net amount of positive cylindrical oblique aberration which matches the aberration produced by the first three elements.

5. The combination of claim 1 where the focal length of the plastic lens system is short enough to prevent significant chromatic aberrations.

6. A plastic anamorphic cylindrical lens system adapted for attachment to cameras having low effective aperture prime lenses to provide an increased angular field of view resulting from a different magnification of image rays in each of two perpendicular directions comprising:
a first diverging group of plastic cylindrical lens elements aligned to have a power plane in one direction and a traverse non-power plane in another direction, at least one cylindrical lens element introducing negative cylindrical oblique ray aberrations in both the power plane and the non-power plane and a second plastic converging cylindrical lens element introducing positive cylindrical oblique ray aberrations to apply a concurrent correction in both the power plane and the non-power plane of the oblique ray aberrations, all of the lenses in the system consisting of only methyl methacrylate.

7. A plastic anamrophic cylindrical lens system adapted for attachment to cameras having low effective aperture prime lenses to provide an increased angular field of view resulting from a different magnification of image rays in each of two perpendicular directions comprising:
a first group of three plastic cylindrical lens elements aligned to have a power plane in one direction and a traverse non-power plane in another direction, the three elements forming a group which diverges the fan of rays entering the first element to introduce a net amount of negative cylindrical oblique aberration, in both the power plane and the non-power plane and a second plastic cylindrical lens element introducing a net amount of positive cylindrical oblique aberration which matches the aberration produced by the first three elements to apply a concurrent correction in both the power plane and the non-power plane of the oblique ray aberrations, all of the lenses in the system consisting of only plastic material.

8. The invention of claim 7 wherein each element is made from a plastic material having a low dispersion property.

9. The invention of claim 8 wherein said plastic material is methyl methacrylate.

10. The invention of claim 9 wherein said elements are shaped and grouped to introduce a relative small amount of bending to a fan of rays at any chosen object point.

11. The invention of claim 7 wherein the first element comprises a lens having a convex cylindrical surface having a radius of 1.2541 inches and a concave cylindrical surface having a radius of 0.5000 inches.

12. The invention of claim 11 wherein said seond element comprises a lens having a first convex cylindrical surface having a radius of 4.0000 inches, said first surface facing the concave surface of said first element, said second element further having a second convex cylindrical surface having a radius of 1.2330 inches.

13. The invention of claim 12 wherein said third element comprises a lens having a first concave cylindrical surface having a radius of 0.8225 inches, said first concave surface facing the second convex surface of said second element, said third element having a second concave cylindrical surface having a radius of 0.7400 inches.

14. The invention of claim 13 wherein said fourth element comprises a lens having a planar surface facing the second surface of said third element and a convex surface having a radius of 0.6335 inches.

15. The inventioof claim 12 wherein the airspace between the first two elements at the optic axis is 0.3034 inches.

16. The invention of claim 13 wherein the airspace between the second and third elements at the optic axis is 0.0837 inches.

17. The invention of claim 14 wherein the airspace between the third and fourth elements at the optic axis is 0.3250 inches.

18. The invention of claim 11 wherein the thickness of the first element along the optic axis is 0.2500 inches.

19. The invention of claim 12 wherein the thickness of the second element along the optic axis is 0.2550 inches.

20. The invention of claim 13 wherein the thickness of the third element along the optic axis is 0.0600 inches.

21. The invention of claim 14 wherein the thickness of the fourth element along the optic axis is 0.1850 inches.

22. The invention of claim 7 wherein the index of refraction for each of the elements is 1.4920.

* * * * *

UNITED STATES PATENT OFFICE
CERTIFICATE OF CORRECTION

Patent No. 3,749,477          Dated July 31, 1973

Inventor(s) John H. Willoughby and Barry G. Broome

It is certified that error appears in the above-identified patent and that said Letters Patent are hereby corrected as shown below:

Column 2, line 65, "or" should be "of".

Column 3, line 53, "faclng" should be "facing".

Column 5, line 22, "anamrophic" should be "anamorphic".

Column 6, line 38, "0.2550" should be "0.2250".

Signed and sealed this 25th day of December 1973.

(SEAL)
Attest:

EDWARD M. FLETCHER, JR.
Attesting Officer

RENE D. TEGTMEYER
Acting Commissioner of Patents